April 26, 1932.   J. LLOBET   1,855,977
BUMPER FOR AUTOMOBILES
Filed Aug. 25, 1931   2 Sheets-Sheet 1
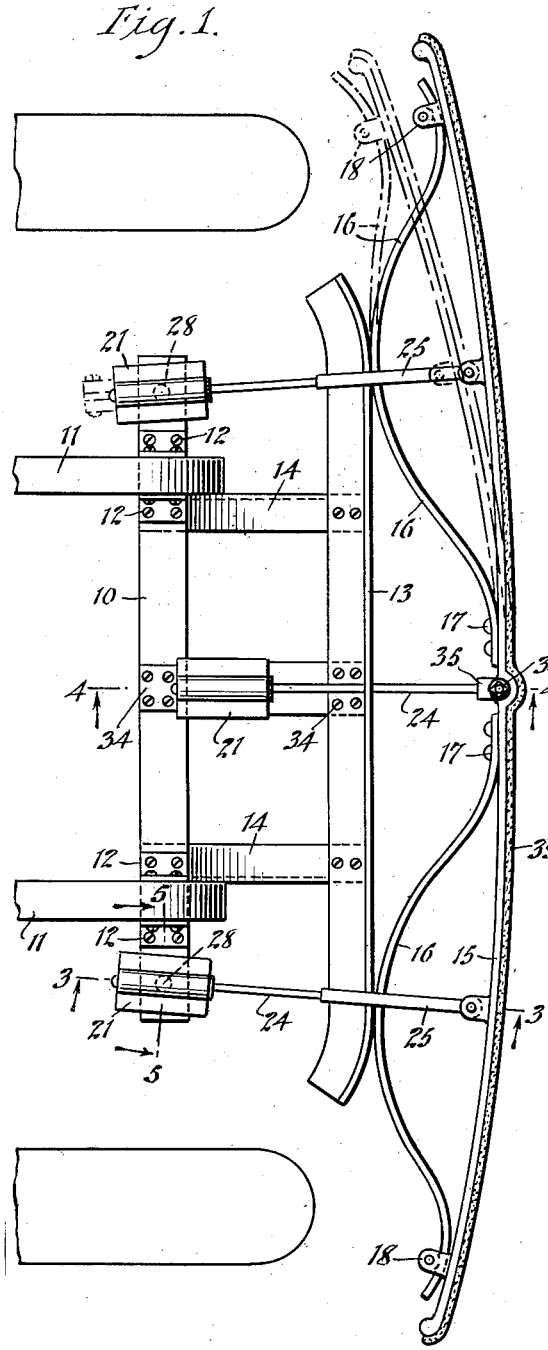
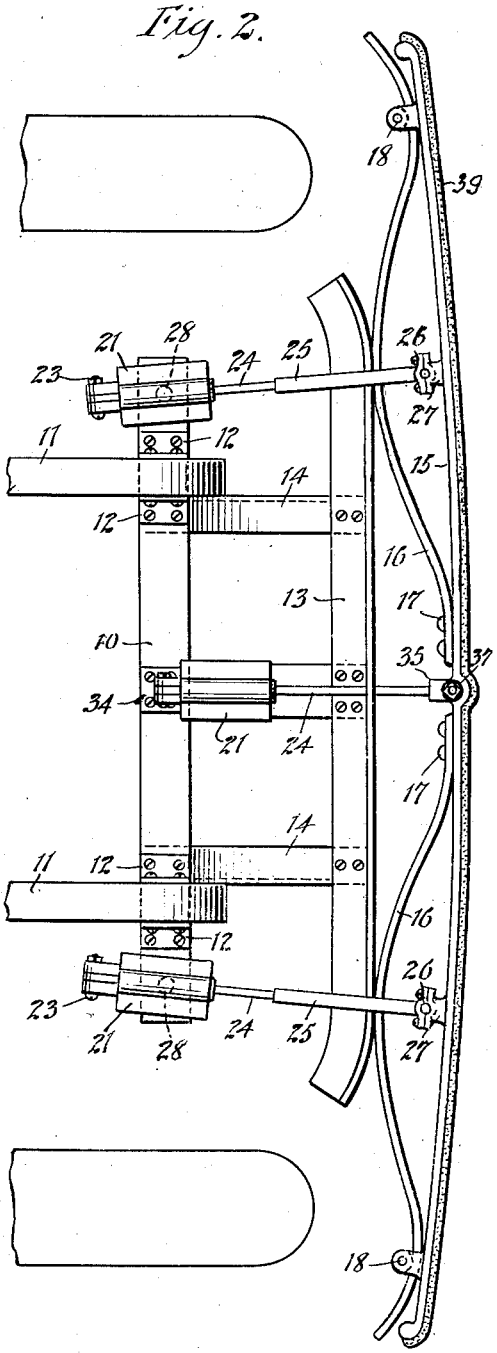
WITNESSES
Edw. Thorpe
Chris Feinle
INVENTOR
Juan Llobet
BY
Munn & Co.
ATTORNEY April 26, 1932.  J. LLOBET  1,855,977
BUMPER FOR AUTOMOBILES
Filed Aug. 25, 1931  2 Sheets-Sheet 2
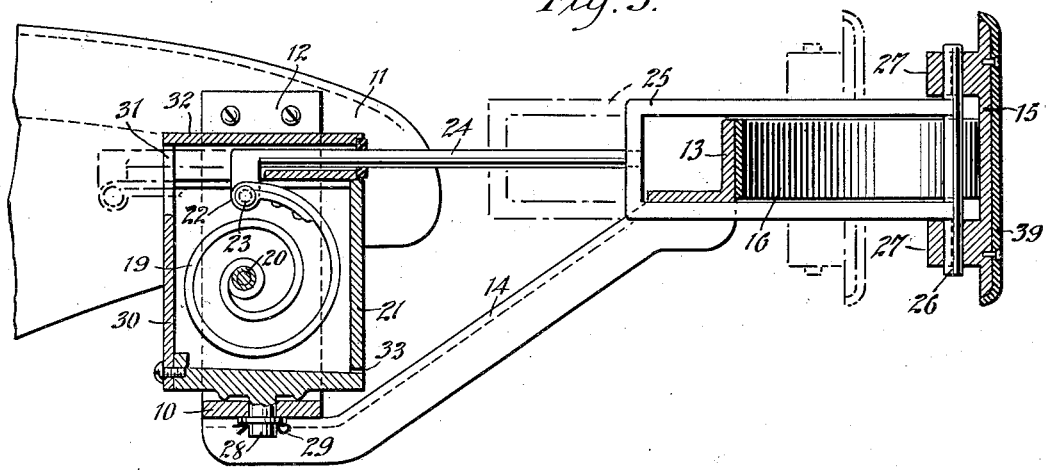
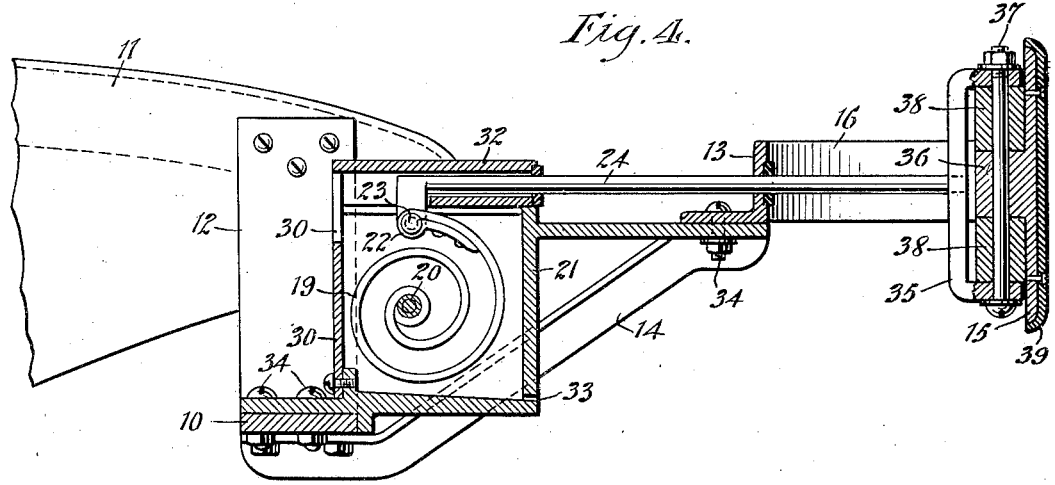
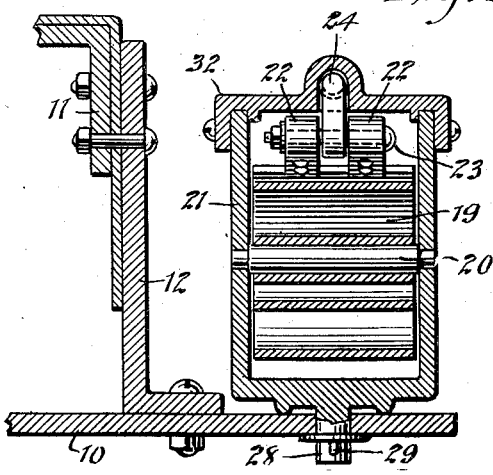
WITNESSES
Edw. Thorpe
Chris Feinle
INVENTOR
Juan Llobet
BY Munn & Co.
ATTORNEY Patented Apr. 26, 1932

1,855,977

UNITED STATES PATENT OFFICE

JUAN LLOBET, OF HABANA, CUBA

BUMPER FOR AUTOMOBILES

Application filed August 25, 1931. Serial No. 559,350.

This invention relates to a bumper or shock absorber such as is used on an automobile and similar vehicle for protecting it against injury by collision and which resists the impact and which absorbs the pressure and shocks sustained by the bumper.

One of the objects of the invention is the provision of a bumper or shock absorber of the indicated character which has great power in resisting the impacts, shocks and forces imposed thereon, and which also allows relatively great flexing or rearward movement of the bumper impact member or bar, and which also has great power for returning or restoring the bumper impact member or bar to its normal position.

Another object of the invention is the provision of a flexible bumper element together with novel means for supporting the same in such a manner as to resist pressure impacts or shocks sustained from head-on collision and from impacts or shocks sustained from different angles.

Another object of the invention is to provide a bumper or shock absorber of the indicated character which is strong and durable in construction and whose parts may be readily assembled for attachment to the vehicle frame.

The nature of the invention and its distinguishing features and advantages will appear when the following specification is read in connection with the accompanying drawings, in which Figure 1 is a top view of the bumper embodying the features of the invention mounted on the front ends of an automobile frame; one end of the flexible bumper bar being shown flexed rearwardly in dot and dash lines;

Figure 2 is a view similar to Figure 1, but showing the bumper bar moved rearwardly from its normal position;

Figure 3 is an enlarged section on the line 3—3 of Figure 1;

Figure 4 is an enlarged section on the line 4—4 of Figure 1;

Figure 5 is an enlarged section on the line 5—5 of Figure 1.

Referring now more particularly to the drawings, it will be apparent that use is made of a transverse supporting bar 10, which is secured to the front ends 11 of the automobile frame by brackets 12. A rigid bumper bar 13 is arranged in advance of the bar 10 and is secured thereto by brackets 14. The bar 13 is in the form of an angle iron and the opposite ends thereof are curved rearwardly. A bumper bar or impact member 15 is arranged in advance of the bar 13. The bar or member 15 is made of spring metal and is of arched or bowed formation. Arched or bowed flat springs 16 are arranged at the rear of the bar or member 15. Each spring 16 has one end thereof securely fastened as at 17 to the bar 15 near the middle thereof, and the opposite or outer end of the spring has guided movement between a roller 18 carried by the bar 15 and the bar. The springs 16 are designed to bear against the bumper bar 13. A spiral spring 19 is provided to cooperate with each end of the spring bar or impact member 15. The spring 19 has one end thereof secured in any practical manner to a retaining member 20 carried by the opposite side walls of a casing 21. The opposite end of the spring 19 has formed therewith or secured thereto spaced eyes 22 which accommodate a pivot bolt 23 with which one end of a rod 24 is connected. The rod 24 extends forwardly and the forward end thereof has an elongated yoke 25 through which the bar 13 and the adjacent spring 16 extend in order that the rod may have the necessary rearward and lateral movement. The yoke 25 carries a pivot 26 whose opposite ends are respectively received in lugs 27 formed on or secured to the rear side of the bar or member 15. The casing 21 has turning movement on a vertical axis and this is accomplished by the provision of a vertical stud 28 depending from the bottom of the casing and which extends through the related projecting end of the supporting bar 10. The casing is held against detachment by the provision of suitable means such as a washer and split pin 29 on the lower end of the stud 28. The rear wall 30 of the casing is removable and is provided with an opening 31 through which the free end of the spring 19 and the rear end of the connected rod 24 may project in the rearward movement or flexing of the bar or member 15. The casing 21 may also be provided with a removable cover 32. By providing the casing with a removable wall and cover access is afforded to the interior of the casing for any purpose such as the lubricating of the movable parts and spring therein. The casing may also be provided with one or more drain holes 33 above the sloping bottom.

From the foregoing it will be apparent that each end of the bumper bar or impact member 15 may flex or move rearwardly by reason of encountering an object which will be resisted by the related spring 16 and spring 19. If the bar or member 15 sustains an impact or shock intermediate the ends thereof all of the springs 16 and 19 will contribute to resist the same as the bar or member 15 moves rearwardly. Attention is called to the fact that the bowed or arched springs 16 furnish great power to not only resist rearward movement of the bar or member 15 in conjunction with the springs 19 but also serve to return or restore the bar or member 15 to its normal position.

It desired, additional means may be provided in conjunction with the bar member 15 to yieldingly resist rearward movement thereof which will be similar to the means operating in conjunction with each end of the bar or member 15. This additional means is shown in Figure 4 and differs from that shown in Figure 3 in that, in lieu of the casing 21 being mounted for turning movement, it is rigidly secured to the bars 10 and 13 as at 34, and the rod 24 extends through the bar 10, the forward end of the rod being provided with a relatively small yoke 35 connected with a lug 36 on the bar 15 by a pivot bolt 37 which extends through the lug 36 and the ends of the yoke 35, there being spacers 38 interposing the lug 36 and the ends of the yoke. In other respects, the provision and arrangement shown in Figure 4 is similar to that shown in Figure 3 and similar reference numerals are applied to the corresponding parts.

If desired, the front face of the bumper bar or impact member 15 may be protected by leather or rubber facing 39.

I claim:

1. A vehicle bumper, comprising an impact member, and means for yieldingly supporting said member for rearward movement including mountings each of which has turning movement on a vertical axis, a spring having one of its ends connected with each mounting, and the opposite end of the spring being connected with said impact member by a rod which is pivotally connected both with the end of the spring and said impact member.

2. A vehicle bumper, comprising a transverse support having means for fixedly attaching it, casings mounted on said support for turning movement, an impact member, a spring within each of said casings and having one of its ends connected therewith, the opposite end of the spring being connected with said impact member by a rod which is pivotally connected both with the end of the spring and said impact member.

3. A vehicle bumper, comprising an impact bumper bar, a fixed bar, flat springs arranged at the rear of said bumper bar and each having one end secured to said bumper bar and its opposite end being free, said springs being in contact with said fixed bar, the provision and arrangement being such that rearward movement of the bumper bar will be yieldingly resisted and it will also be returned to its normal position when pressure thereon has been withdrawn, and additional means operable in conjunction with said bumper bar to yieldingly resist the rearward movement thereof.

4. A vehicle bumper, comprising an impact bumper bar, a fixed bar, springs arranged between the said bars to yieldingly resist rearward movement of the bumper bar and also to return it to its normal position when pressure thereon has been withdrawn, casings mounted for turning movement, a spring within each of said casings and having one of its ends connected therewith, the opposite end of the spring being connected with said bumper bar by a rod which is pivotally connected both with the end of the spring and said bumper bar, each second mentioned spring aiding the first mentioned springs to yieldingly resist the rearward movement of the bumper bar.

JUAN LLOBET.